United States Patent

Corsini

(10) Patent No.: US 11,135,652 B2
(45) Date of Patent: Oct. 5, 2021

(54) LASER 3D PRINTER

(71) Applicant: 3D4MEC SRL, Sasso Marconi (IT)

(72) Inventor: Ivano Corsini, Sasso Marconi (IT)

(73) Assignee: 3D4MEC SRL, Sasso Marconi (IT)

(*) Notice: Subject to any disclaimer, the term of this patent is extended or adjusted under 35 U.S.C. 154(b) by 86 days.

(21) Appl. No.: 16/210,616

(22) Filed: Dec. 5, 2018

(65) Prior Publication Data

US 2019/0193157 A1  Jun. 27, 2019

(30) Foreign Application Priority Data

Dec. 7, 2017  (IT) .................. 102017000141586

(51) Int. Cl.

| | |
|---|---|
| *B22F 10/20* | (2021.01) |
| *B33Y 30/00* | (2015.01) |
| *B33Y 40/00* | (2020.01) |
| *B29C 64/357* | (2017.01) |
| *B29C 64/153* | (2017.01) |
| *B33Y 50/02* | (2015.01) |
| *B22F 10/30* | (2021.01) |

(52) U.S. Cl.
CPC ............ *B22F 10/20* (2021.01); *B29C 64/153* (2017.08); *B29C 64/357* (2017.08); *B33Y 30/00* (2014.12); *B33Y 40/00* (2014.12); *B33Y 50/02* (2014.12); *B22F 10/30* (2021.01)

(58) Field of Classification Search
CPC ......... B22F 3/1055; B22F 10/20; B22F 10/30
See application file for complete search history.

(56) References Cited

U.S. PATENT DOCUMENTS

| | | | |
|---|---|---|---|
| 2015/0287397 A1 | 10/2015 | Chen et al. | |
| 2017/0348771 A1* | 12/2017 | Kawada | ................. B33Y 30/00 |

FOREIGN PATENT DOCUMENTS

| | | |
|---|---|---|
| WO | WO2016133456 | 8/2015 |

OTHER PUBLICATIONS

Italian Search Report for Corresponding Application IT201700141586 dated Aug. 21, 2018.

* cited by examiner

*Primary Examiner* — Nahida Sultana
*Assistant Examiner* — Asha A Thomas
(74) *Attorney, Agent, or Firm* — Gottlieb, Rackman & Reisman, PC

(57) ABSTRACT

Laser 3D printer having a compartment, which has a longitudinal axis substantially vertical with respect to a supporting plane, and is delimited by a side wall extending around the longitudinal axis; and a platform, which is engaged in a sliding manner in the compartment; a feeding assembly to feed a powder material onto the platform; and a laser printing head to sinter the powder material disposed on the platform itself; the printer having a chamber configured to collect, in use, the non-sintered powder material falling from the platform; wherein the printer has a pneumatic recirculation system configured to pneumatically transport the powdered material from the chamber to the feeding assembly.

9 Claims, 3 Drawing Sheets

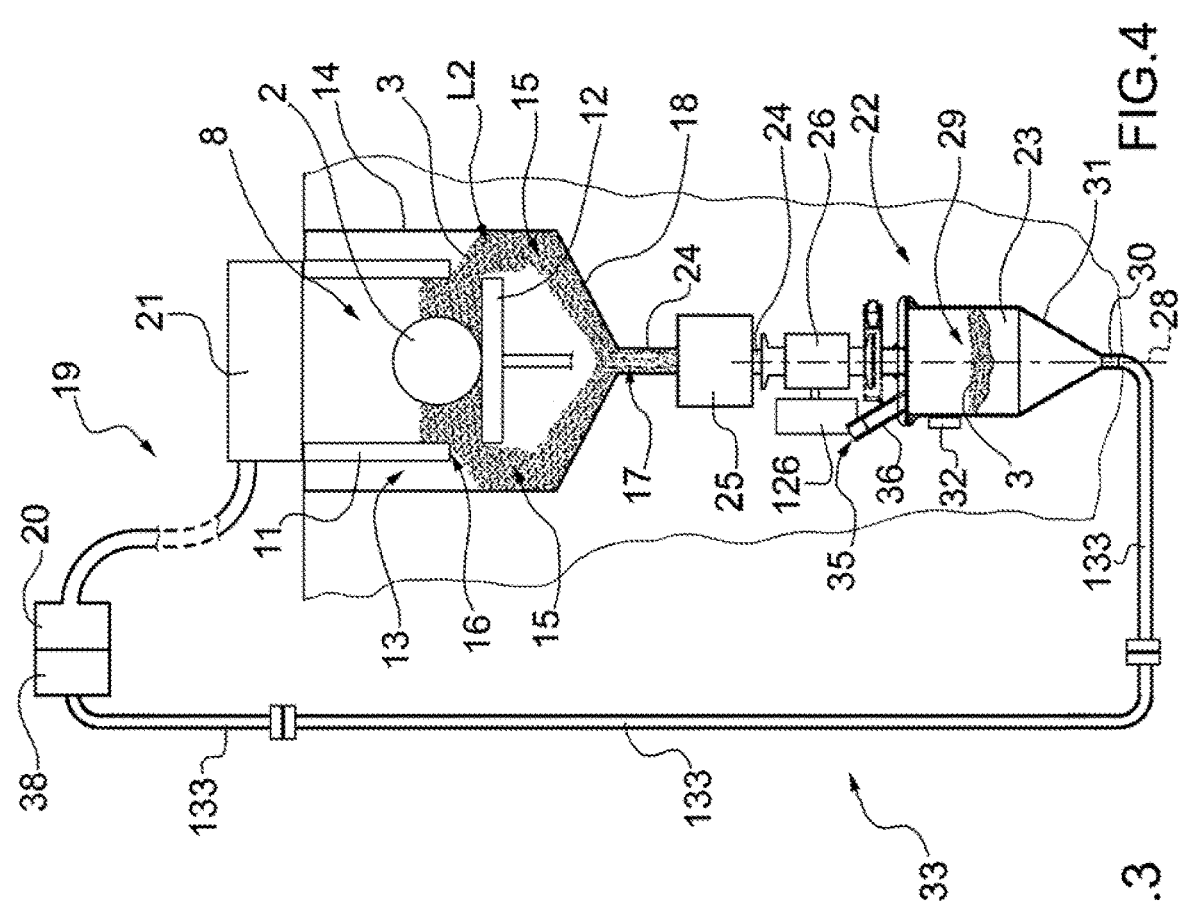
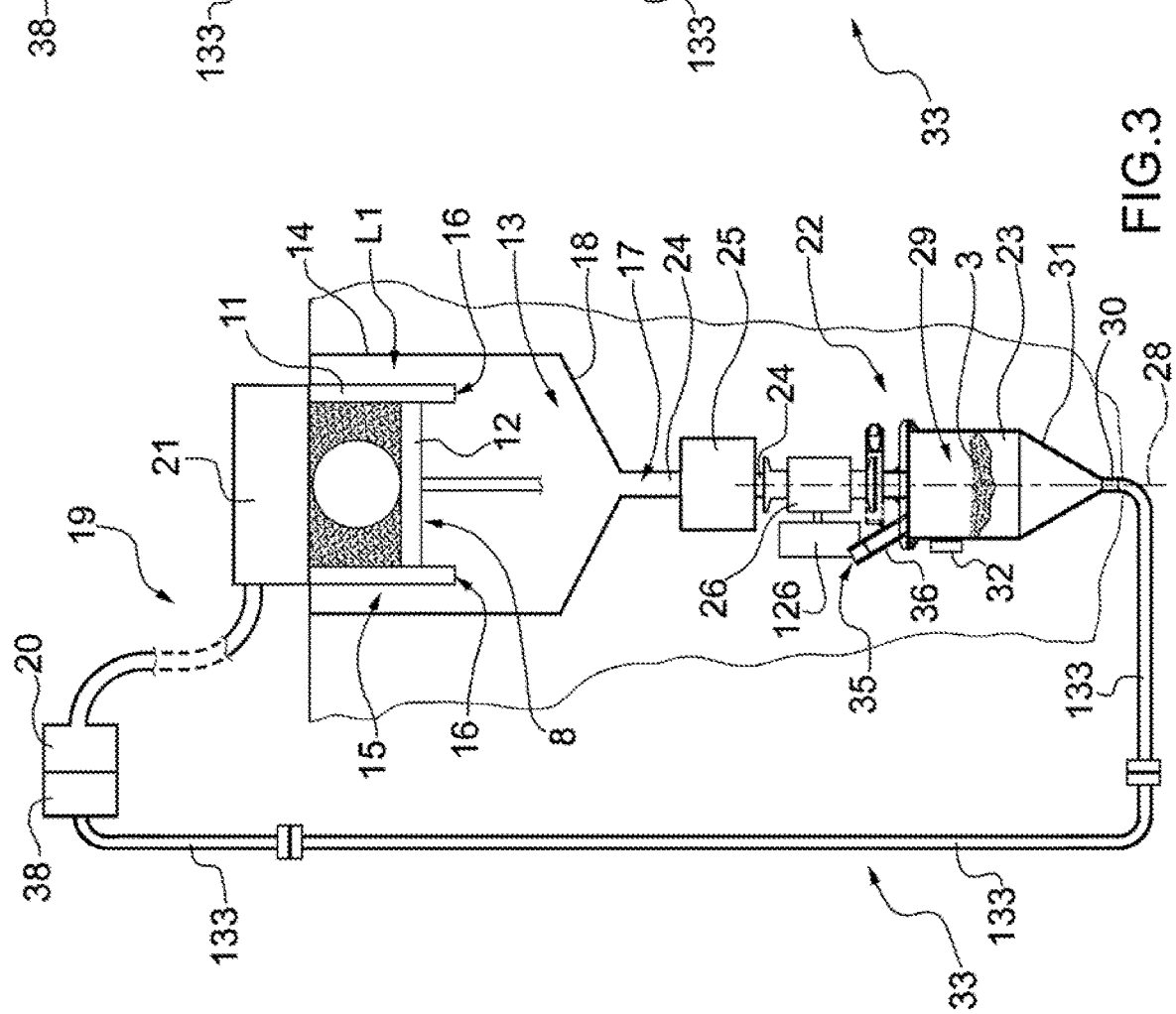

LASER 3D PRINTER

CROSS-REFERENCE TO RELATED APPLICATIONS

This patent application claims priority from Italian Patent Application No. 102017000141586 filed on Dec. 7, 2017, the disclosure of which is incorporated by reference.

TECHNICAL FIELD

The present invention relates to a laser 3D printer.

BACKGROUND ART

In particular, the present invention relates to a laser 3D printer of the type comprising a compartment, a platform which is engaged in a sliding manner in the compartment, a feeding assembly to feed a powder material onto the platform, a laser printing head to sinter the powder material disposed on the platform and a collection chamber.

An object is produced by means of a repetition of work cycles, during which the products are made layer-by-layer, melting and solidifying the powder material. The platform is gradually lowered to enable the feeding assembly to feed, each time, a new layer of powder material onto the platform at the end of each operating cycle of the laser printing head.

On processing completion, the platform is lifted at an upper open end of the compartment to enable the retrieval of the produced item.

Given that the operations described above are carried out in succession, one after the other, the non-sintered powder is dropped into a collection chamber and has to be removed at the end of the processing.

The laser 3D printers of the type described above have the drawback of requiring the direct intervention of an operator and a switched off printer for the manual emptying of the collection chamber. Moreover, the powder material is very thin and volatile; therefore such an operation requires particular procedures and care in order to avoid an excessive dispersion of the powder material and inhalation by the operator. Moreover, it is necessary to follow some protocols to avoid volatilisation and possible explosions, especially should the powder material be metallic.

Moreover, the use is known of recirculation systems to automatically take back the powder material from a collection chamber to a distribution chamber, such recirculation systems being mechanical and comprising for example screw conveyors. The drawback of known recirculation systems is that they are expensive and complex to produce, they generate friction between the transported powder material and the recirculation system itself and have air gaps in which the powder material may accumulate.

DISCLOSURE OF INVENTION

The purpose of the present invention is to provide a laser 3D printer that allows to automatically empty the collection chamber, i.e. without the intervention of an operator.

The purpose of the present invention is to make a laser 3D printer that overcomes the drawbacks described above and that is simple and cheap to produce.

According to the present invention a laser 3D printer is produced as claimed in the accompanying claims.

BRIEF DESCRIPTION OF THE DRAWINGS

The present invention will now be described with reference to the accompanying drawings, illustrating a non-limiting embodiment thereof, in which:

FIG. 3 is a schematic illustration of a detail of FIG. 2 in a first operating configuration; and, FIG. 4 is similar to FIG. 3 and illustrates the detail of FIG. 2 in a second operating configuration.

BEST MODE FOR CARRYING OUT THE INVENTION

Figure 1:
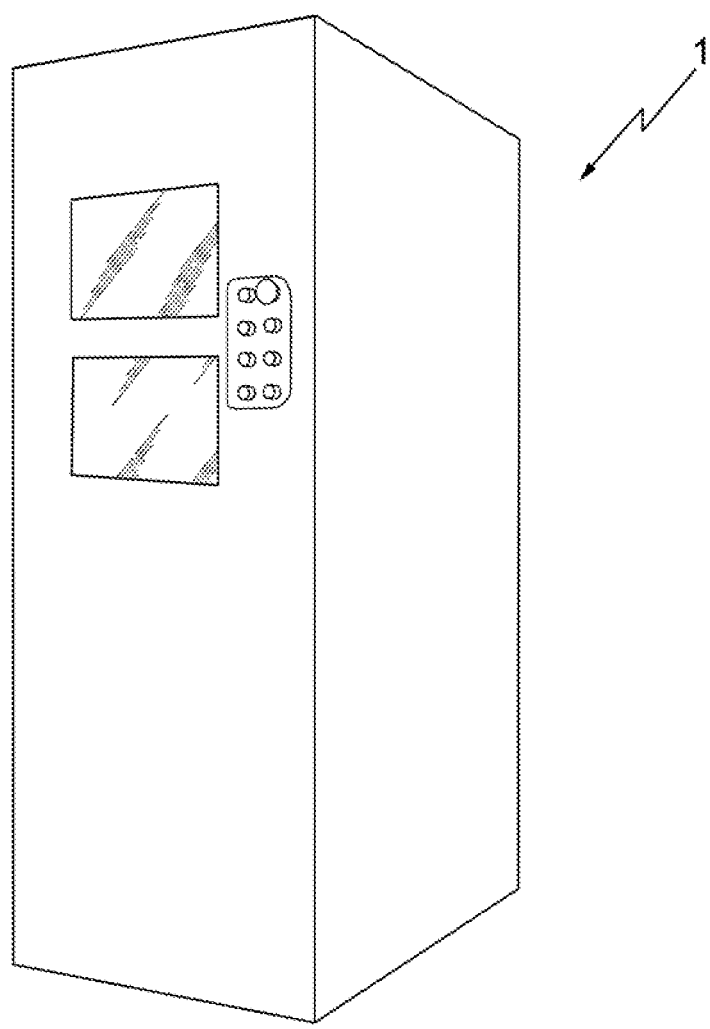
FIG. 1 is a perspective and schematic view of a laser 3D printer according to the present invention.
Figure 2:
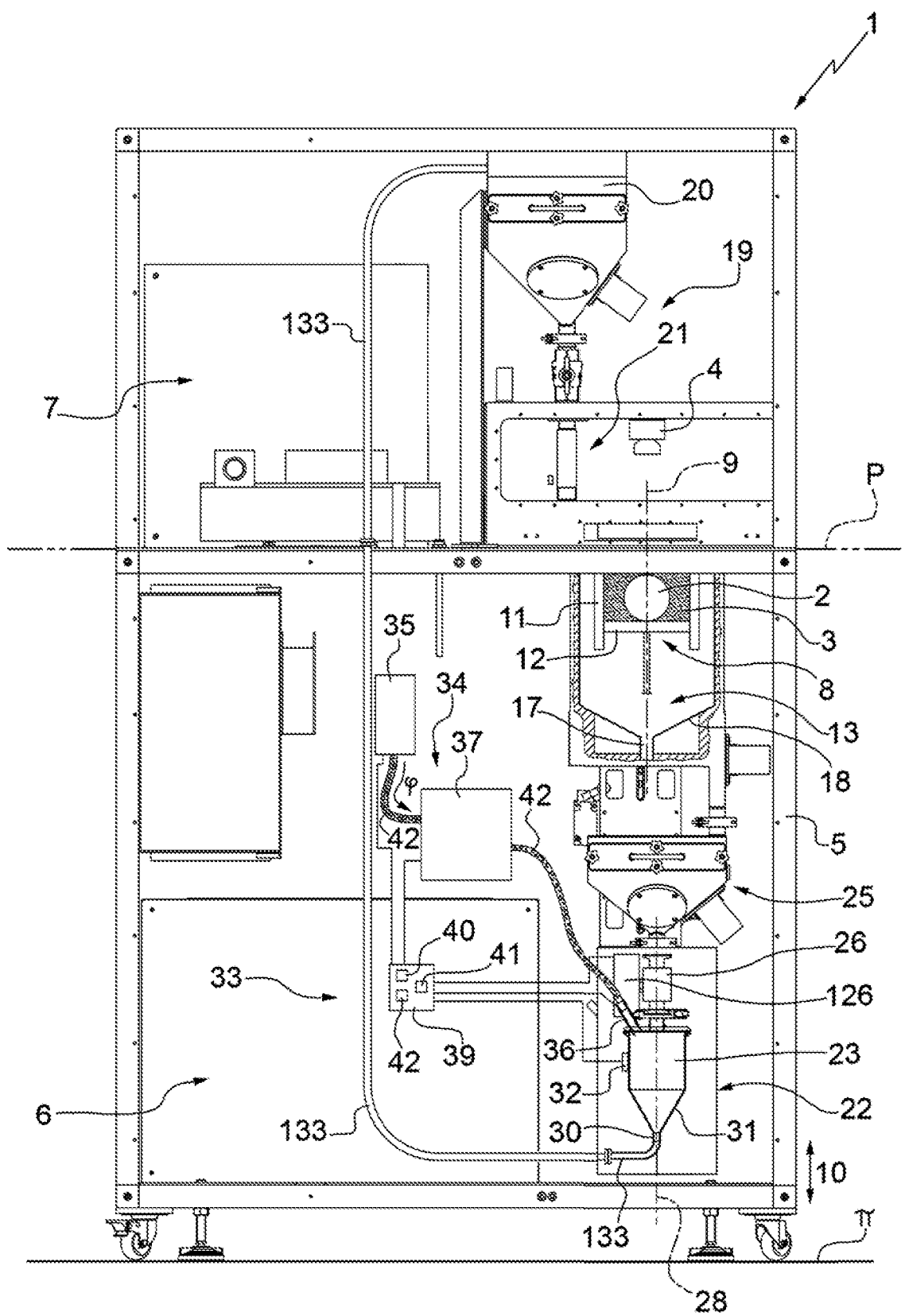
FIG. 2 is a side view, with some parts removed for clarity, on an enlarged scale and some parts partially shown as cross-sectional views of the laser 3D printer of FIG. 1.

In FIGS. 1 and 2, number 1 indicates, in its entirety, a laser 3D printer to make three-dimensional objects 2 for sintering a powder material 3 using a laser printing head 4.

The printer 1 comprises a supporting frame 5 comprising, in turn, a lower boxed body 6 and a higher boxed body 7 connected to each other at a separation plane P, which is substantially horizontal and parallel to a supporting plane n.

As is shown in the schematic illustration of FIGS. 2 and 3, the body 6 accommodates a tubular working compartment 8 inside it, which has a longitudinal axis 9 parallel to a direction 10 substantially vertical and perpendicular to the supporting plane n, extends downwards starting from the plane P and has a substantially square transversal section.

The compartment 8 is delimited by a side wall 11 engaged in a sliding manner by a platform 12, which extends perpendicularly to the direction 10, and is movable along the compartment 8 in the direction 10 itself activated by a known actuating device which is not shown. The platform 12 is movable from a working position L1 (shown in FIG. 3) to a discharge position L2 of the powder material 3 (shown in FIG. 4) and vice versa.

The platform 12 is connected with a known vibrating device, which is not shown, adapted to impart vibrations to the platform 12 itself according to a given law.

The compartment 8 is located inside a collection chamber 13, which extends downwards starting from the plane P, further extends around the wall 11 and is delimited by a side wall 14.

The walls 11, 14 define an annular channel 15 between them. The compartment 8 communicates with the chamber 13 through a lower opening 16. According to a variation which is not shown, the wall 11 has one or more openings disposed in an intermediate part of the wall 11 and distributed around the axis 9.

The chamber 13 comprises a bottom wall 18 that has an outlet 17 of the material 3. The wall 18 is configured to make the material 3 slide towards the outlet 17, in particular it slopes downwards.

The printer 1 further comprises a feeding assembly 19 to feed the powder material 3 onto the platform 12.

The feeding assembly 19 comprises a distribution tank 20 mounted above the body 7, and a dosing and distribution unit 21 mounted above the plane P and connected to the distribution tank 20.

Finally, the printer 1 comprises a recirculation system 22 of the powder material 3 collected in the chamber 13 and fed to the outlet 17.

The recirculation system 22 comprises a collection tank 23 disposed underneath the outlet 17; a conduit 24 extending between the outlet 17 and the tank 23.

The recirculation system 22 further comprises a filter 25 mounted at the entrance of the conduit 24, in particular a sieve filter 25. The recirculation system 22 further comprises a valve 26 installed along the conduit 24 and interposed between the filter 25 and the tank 23. In particular, the valve 26 comprises an automatic actuator 126. The valve 26 is a pneumatically actuated ball valve.

According to the example illustrated in FIGS. 2 and 3, the tank 23 is a hopper, which is fluidly connected to the valve 26 and disposed below the valve 26 to receive the powder material 3 that exits from the valve 26 itself.

The hopper 23 has a longitudinal axis 28 substantially parallel to the direction 10 and perpendicular to the plane P. The hopper 23 has a cavity 29 and an outlet 30 of the material 3. The hopper 23 has a bottom wall 31 that delimits the cavity 29 inferiorly and delimits the outlet 30. The bottom wall 31 is configured to make the material 3 slide towards the outlet 30. In particular, the bottom wall 31 slopes downwards. Advantageously, the hopper 23 is made with a plurality of interconnected pieces, to be easily dismantled.

Advantageously, the hopper 23 comprises a level sensor 32 configured to detect the filling level of the cavity 29. In particular, the hopper 23 has a maximum filling level.

The recirculation system 22 further comprises a conduit 33 that connects the outlet 30 of the hopper 23 to the distribution tank 20.

Advantageously, the conduit 33 is made with a plurality of interconnected portions 133. Thereby, the conduit 33 can be dismantled to allow maintenance activities inside each single portion 133.

Advantageously, the recirculation system 22 comprises a gas φ feeding system 34 configured to feed pressurised gas φ into the cavity 29.

The feeding system 34 comprises a source 35 of pressurised gas φ, a nozzle 36 that is fixed to the hopper 23 and is configured to inject pressurised gas φ into the cavity 29 in a position higher than the maximum level.

The feeding system 34 comprises a tube 42, which connects the source 35 to the nozzle 36. The feeding system 34 comprises a regulation unit 37 interposed between the source 35 and the nozzle 36, to regulate the gas φ flow fed to the nozzle 36. In particular, the regulation unit 37 comprises some solenoid valves configured to regulate, in a known manner, the pressure of the gas φ fed by the hopper 23.

The gas φ is chosen amongst a group of different gases including for example air or inert gases such as nitrogen or argon. Preferably, the gas φ is nitrogen.

The recirculation system 22 further comprises a gas filter 38 interposed between the conduit 33 and the distribution tank 20. The filter 38 is configured to allow the discharge of the gas φ from the recirculation system 22, to allow only the feeding of the powder material 3 inside the distribution tank 20.

The printer 1 further comprises a control unit 39, which is connected to the actuator 126 of the valve 26, to the level sensor 32 and to the regulation unit 37. The control unit 39 is also possibly connected to the source 35.

In turn, the control unit 39 comprises a memory unit 40, in which association data are stored for the association between processing parameters of the recirculation of the powder material 3 to be performed and operating parameters for performing the recirculation. The control unit 39 further comprises a processing unit 41, which determines, in use, the operating parameters according to the detected processing parameters and the association data.

In particular, the processing data comprise the filling level of the hopper 23 detected by the level sensor 32. The operating data comprise the pressure of the gas φ discharged from the regulation unit 37 and the open/closed status of the valve 26.

The control unit 39 further comprises a user interface 42 to exchange data externally, for example with an operator. For example, the user interface 42 is a display, alternatively the user interface 42 is capable of exchanging data with a remote unit, for example a PC or a mobile device.

It should be noted that it is known that there are two different types of pneumatic transport of dried powders, i.e. with a moisture content lower than 20%:

diluted phase conveying, with a gas φ velocity of 20-30 m/s; and dense phase conveying, with a gas φ velocity of 5-10 m/s.

Moreover, pneumatic transport can occur by thrusting or by suction.

Advantageously, the recirculation system 22 is a thrusting and dense phase pneumatic transport system. In particular, the control unit 39 regulates the gas feeding system 34 to carry out a dense phase pneumatic transport of the powder material 3 along the conduit 33.

The operation of the printer 1 will now be described starting from the moment in which the platform 12 is disposed at a distance from the plane P similar to the thickness of a layer of the material 3.

In use, for making the object 2 in a known manner, the dosing and distribution unit 20 cyclically distributes the powder material 3 onto the platform 12.

During the making of the object 2, the platform 12 is always disposed in a working position (L1), which is above said lower opening 16 and that can vary between cycles. Once the object 2 is made, the platform 12 is lowered underneath the lower opening 16, in a discharge position L2, and caused to vibrate to enable the material 3 to: exit from the compartment 8, enter into the chamber 13 and move towards the outlet 17.

According to a variation which is not shown, the non-sintered powder material 3 can fall also during processing on the side of the platform and through the lower opening. In this case the platform cannot be taken to a discharge position.

The material 3 that goes through the outlet 17 is moved forward from the outlet 17 through the sieve filter 25, along the conduit 24, and into the tank 23, and is finally fed again into the distribution tank 20 by the recirculation system 22.

Hence, the printer 1 has the advantage that the powder material 3 is partly used in order to make the object 2 and partly taken back by means of the recirculation system 22 into the tank 20, without being dispersed in the surroundings of the compartment 8 and without requiring retrieval operations of the residual material 3 by the responsible staff.

Advantageously, the fact that the recirculation of the powder material 3 occurs with a pneumatic system allows to eliminate friction and wear compared to the known mechanical recirculation systems. Moreover, the recirculation system 22 of the type described above is simpler and more economical to make, is more compact and is simpler and more economical to maintain.

Advantageously, when the recirculation system 22 is activated, i.e. when the nozzle 36 feeds pressurised gas φ into the cavity 29, the valve 26 is closed to prevent the gas φ and possibly some powder material 3 from going up into the compartment 8, through the outlet 17 and the chamber 13.

When the valve 26 is closed it allows to isolate the recirculation system 22 from the compartment 8. In other words, the recirculation system 22 is independent (stand alone). This entails a plurality of advantages:
- the recirculation system 22 may be of the thrust type, with a higher performance and a simpler structure compared to a suction system;
- the recirculation of the powder material 3 can occur while processing is taking place in the compartment 8, preventing the gas φ from entering inside the compartment 8 and interfering with the ongoing processing;
- maintenance operations can be carried out in the recirculation system 22 while processing is taking place in the compartment 8.

Advantageously, the fact that the transport of the powder material 3 occurs as dense phase pneumatic conveying allows to completely eliminate the risk of explosion, such as for example in the case of transport of metal powders. Moreover, dense phase pneumatic conveying allows to use a conduit 33 with a small diameter. This allows to obtain a recirculation system of the powder material 3 which is safe and space-saving.

Furthermore, the recirculation system 22 of the type described above can be dismantled easily and quickly, hence it is possible to carry out maintenance activities rapidly and simply also when the printer 1 is in operation, i.e. a processing in the compartment 8 is taking place.

The invention claimed is:

1. A laser 3D printer, comprising:
a compartment, which has a longitudinal axis substantially vertical with respect to a supporting plane and is delimited by a side wall extending around the longitudinal axis;
a platform, which is engaged in a sliding manner in the compartment;
a feeding assembly that is configured to feed a powder material onto the platform;
a laser printing head that is configured to sinter the powder material disposed on the platform;
a chamber located downstream of the feeding assembly and the laser printing head that is configured to collect, in a use state of the printer, the non-sintered powder material falling from the platform;
a pneumatic recirculation system arranged downstream of and connected to the chamber by a first conduit that is configured to pneumatically transport the non-sintered powdered material from the chamber to the feeding assembly,
wherein the pneumatic recirculation system comprises:
a hopper;
a first conduit that extends between the chamber and a proximal end of the hopper;
a second conduit that extends between a distal end of the hopper and the feeding assembly;
a valve disposed along the first conduit and interposed between the chamber and the hopper, the hopper that includes a cavity therein and a gas feeding system that includes a source of gas and that is configured to feed pressurized gas from the source through a tube and a nozzle into the cavity of the chamber, the nozzle being configured to inject the gas into the cavity and thrust the non-sintered powder material through the second conduit to allow only non-sintered powder material to be fed back into the feeding assembly;
a regulation unit disposed along the tube, upstream from the nozzle,
a valve installed along a conduit and interposed between the chamber and the hopper,
an actuator that is configured to control the valve,
a level sensor configured to generate signals in function of the detect a filling level of the cavity, and
a control unit, which regulates the gas feeding system and is connected to the regulation unit, the actuator and the level sensor.

2. A laser 3D printer according to claim 1, wherein the nozzle is installed on the hopper to inject the gas into the cavity and thrusting the powdered material along the second conduit.

3. A laser 3D printer according to claim 1, wherein a filter interposed between the second conduit and the feeding assembly that is configured to discharge the gas to an external environment and to allow only the non-sintered powder material to pass into the feeding assembly.

4. A laser 3D printer according to claim 1, wherein the control unit comprises a memory unit, in which association data is stored for association between processing parameters of recirculation of the non-sintered powder material to be performed and operating parameters for performing the recirculation and a processing unit, which determines, in the use state, the operating parameters according to detected processing parameters and the association data, the processing parameters comprising a filling level of the cavity and the operating parameters comprising an opening/closing of the valve and gas pressure fed to the nozzle to allow transport as dense phase pneumatic conveying of the powder material.

5. A laser 3D printer according to claim 1, wherein the compartment is inside the chamber to delimit an annular channel, the compartment communicates with the chamber through a lower opening and the platform is movable from a working position, above said opening, to a discharge position, underneath said opening and vice versa.

6. A laser 3D printer according to claim 1, wherein the second conduit comprises a plurality of portions that are configured to be dismantled.

7. A laser 3D printer according to claim 1, wherein the hopper is configured to be dismantled.

8. A laser 3D printer according to claim 1, in which the valve is a ball valve.

9. A laser 3D printer according to claim 1, wherein the regulation unit comprises at least one solenoid valve.

* * * * *